(12) United States Patent
Kimura

(10) Patent No.: US 7,650,123 B2
(45) Date of Patent: Jan. 19, 2010

(54) RECEIVER AND A METHOD OF ATTENUATING A DISTURBANCE SIGNAL BY A TRAP CIRCUIT HAVING ITS RESONANCE FREQUENCY ADJUSTABLE

(75) Inventor: Atsushi Kimura, Saitama (JP)

(73) Assignee: Oki Semiconductor Co., Ltd. (JP)

( * ) Notice: Subject to any disclaimer, the term of this patent is extended or adjusted under 35 U.S.C. 154(b) by 490 days.

(21) Appl. No.: 11/519,974

(22) Filed: Sep. 13, 2006

(65) Prior Publication Data
US 2007/0066264 A1    Mar. 22, 2007

(30) Foreign Application Priority Data
Sep. 16, 2005  (JP)  ............................ 2005-270398
Aug. 30, 2006  (JP)  ............................ 2006-233615

(51) Int. Cl.
*H04B 1/06*  (2006.01)
*H04B 7/00*  (2006.01)

(52) U.S. Cl. ................. 455/130; 455/191.3; 455/249.1; 455/286

(58) Field of Classification Search ... 455/188.1–191.3, 455/197.2, 249.1, 278.1, 283–286, 295, 296, 455/302; 348/725–739
See application file for complete search history.

(56) References Cited

U.S. PATENT DOCUMENTS

| 4,368,541 | A | * | 1/1983 | Evans | 455/185.1 |
| 4,399,559 | A | * | 8/1983 | Theriault | 455/179.1 |
| 4,499,602 | A | * | 2/1985 | Hermeling et al. | 455/180.3 |
| 4,731,877 | A | * | 3/1988 | Moon | 455/340 |
| 5,212,828 | A | * | 5/1993 | Hatashita et al. | 455/295 |
| 5,517,685 | A |   | 5/1996 | Aoyama et al. |  |
| 5,898,911 | A | * | 4/1999 | White | 455/232.1 |
| 6,032,031 | A | * | 2/2000 | Takaki | 455/245.2 |
| 6,041,224 | A | * | 3/2000 | Wada | 455/327 |
| 2003/0008617 | A1 | * | 1/2003 | Tamaru et al. | 455/46 |
| 2004/0009753 | A1 | * | 1/2004 | Ogata | 455/78 |

* cited by examiner

*Primary Examiner*—Simon D Nguyen
(74) *Attorney, Agent, or Firm*—Studebaker & Brackett PC; Donald R. Studebaker

(57) ABSTRACT

A receiver for receiving a radio frequency signal includes an attenuator for attenuating a disturbance signal such as an image signal which causes disturbance to a received frequency of the radio frequency signal, on the basis of set information of the received frequency. The attenuator includes a trap circuit for producing a resonance frequency in accordance with the set information. The trap circuit is connected on a supply line for the radio frequency signal and suppresses the disturbance signal by the resonance frequency.

16 Claims, 6 Drawing Sheets

RECEIVER AND A METHOD OF ATTENUATING A DISTURBANCE SIGNAL BY A TRAP CIRCUIT HAVING ITS RESONANCE FREQUENCY ADJUSTABLE

BACKGROUND OF THE INVENTION

1. Field of the Invention

The present invention relates to a receiver that attenuates a disturbance signal such as an image signal which causes disturbance in signal reception in radio equipment, and a disturbance signal attenuating method that is used in such equipment.

2. Description of the Background Art

Heretofore, in receivers in radio equipment, a radio frequency (RF) signal has been converted to an intermediate frequency (IF) signal by a frequency mixer such as an image rejection mixer. In addition, in conventional receivers, in the case where the frequency of the IF signal is high, in order to suppress a disturbance signal such as an image signal which causes disturbance in signal reception, a band-pass filter (BPF) is provided in the stage before the image rejection mixer for passing only a predetermined frequency band therethrough, thereby an image signal in an RF signal being attenuated.

For example, in a multi-channel FM receiver disclosed in U.S. Pat. No. 5,517,685 to Aoyama et al., there is provided a variable frequency band-pass filter that selects a frequency-modulated (FM) signal on a desired channel in response to a channel selection command signal issued from a controller, and only a desired channel is selected, whereby image disturbance can be suppressed.

However, in the multi-channel FM receiver disclosed in Aoyama et al., in the case where the number of channels increases, the variable frequency range of the variable frequency band-pass filter becomes wide and thus it is difficult to implement this receiver.

In addition, in the conventional receiver, if the frequency of an IF signal becomes low, the band-pass filter passes a disturbance signal as it is and therefore the attenuation of the disturbance signal becomes slight. Thus, it is difficult to meet reception standards for radio equipment.

SUMMARY OF THE INVENTION

It is the primary object of the present invention to provide a receiver and a disturbance signal attenuating method that are capable of attenuating a disturbance signal, such as an image signal which causes disturbance to a received frequency of a radio frequency signal, in a broad frequency band.

In accordance with the present invention, there is provided a receiver for receiving a radio frequency signal, comprising an attenuator for attenuating a disturbance signal such as an image signal which causes disturbance to a received frequency of the radio frequency signal, on the basis of set information of the received frequency. The attenuator includes a trap circuit for producing a resonance frequency according to the set information. The trap circuit is connected on a supply line for the radio frequency signal and suppresses the disturbance signal by the resonance frequency.

In accordance with the present invention, there is provided a method, in a receiver for receiving a radio frequency signal, of attenuating a disturbance signal such as an image signal which causes disturbance to a received frequency of the radio frequency signal. The method includes a first step of producing a resonance frequency according to set information of the received frequency, and a second step of suppressing the disturbance signal by the resonance frequency in the trap circuit. The disturbance signal is attenuated on the basis of the set information.

According to the receiver of the present invention, in the disturbance signal attenuator, the structurally simple trap circuit with a small number of components is provided in the stage before the frequency mixer such as an image rejection mixer. The attenuator is controlled based on the set information of a received frequency such as a voltage value, a current value, and digital data, and the trap circuit interlocks a tuning frequency with the received frequency in accordance with this set information, whereby a disturbance signal such as an image signal can be effectively suppressed.

In the receiver of the present invention, a control voltage according to the set information may be input into the trap circuit to determine a resonance frequency of the trap circuit. By adjusting this control voltage in the voltage gradient adjustor, an input voltage to the trap circuit is temperature-corrected, whereby the receiver can cope with a change in the temperature characteristic of the trap circuit. In addition, in the receiver of the present invention, a frequency band in the attenuator can be selected according to the set information. In the receiver in accordance with the present invention, for instance, an inductor is selected which is to be employed in the trap circuit to thereby be able to cope with a broad frequency band.

According to the receiver of the present invention, in the disturbance signal attenuator, a set frequency in a phase-locked loop can be employed as the set information of a received frequency, and the trap circuit interlocks a tuning frequency with the received frequency in accordance with this set information, whereby a disturbance signal such as an image signal can be effectively suppressed.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
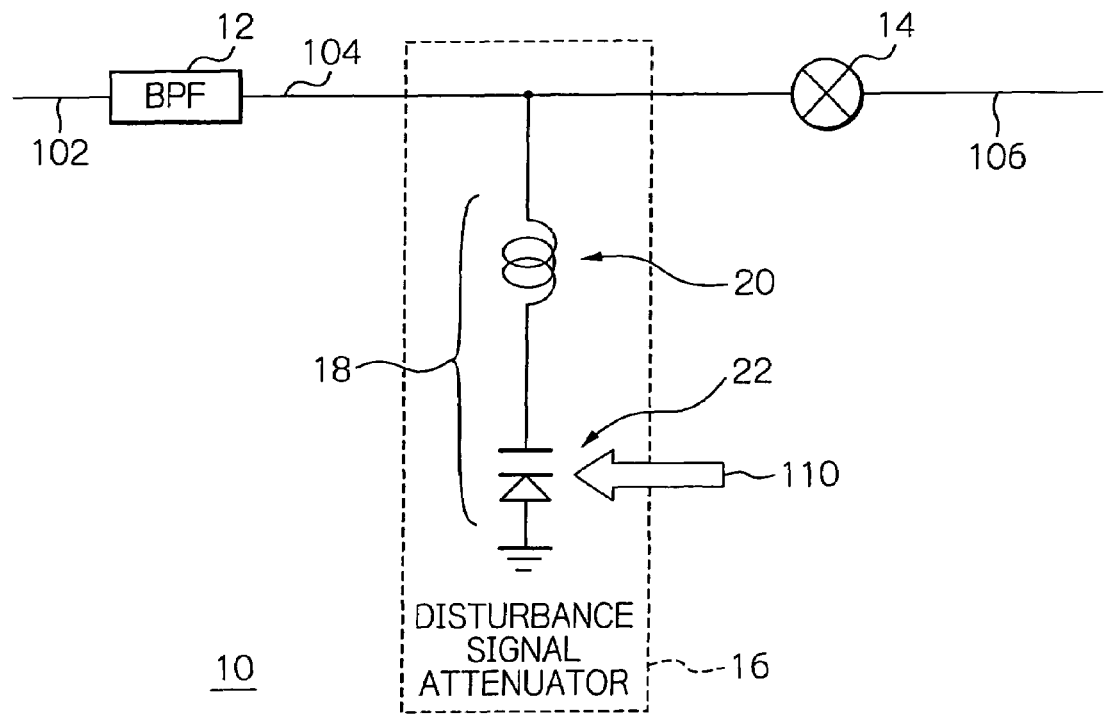
FIG. 1 is a schematic block diagram showing an embodiment of a receiver of the present invention.

Next, with reference to the accompanying drawings, an embodiment of the disturbance signal attenuator of a receiver according to the present invention will be described in detail. For example, the receiver, generally designated with a reference numeral 10, as a portion thereof is shown in FIG. 1, includes a frequency mixer 14 which is adapted to frequency-convert a radio frequency (RF) signal 104 input from a band-pass filter (BPF) 12, thereby producing an intermediate frequency (IF) signal 106. Particularly, in the instant embodiment, a disturbance signal attenuator 16 including a trap circuit 18 is provided in the stage before the frequency mixer 14 to attenuate a disturbance signal such as an image signal in the input radio frequency signal 104 based on the set information of the received frequency. Note that parts or elements not direct relevant to understanding the present invention will neither be described nor shown for avoiding redundancy.

The band-pass filter (BPF) 12 is adapted to receive a radio frequency (RF) signal 102 and pass only its predetermined frequency band, thereby outputting the RF signal 104. Signals are designated with reference numerals designating connections on which they appear.

The frequency mixer 14 is a converter to frequency-convert the RF signal 104, thereby producing the intermediate frequency (IF) signal 106. The frequency mixer 14 may be, for example, a down-converting mixer such as an image rejection mixer which down-converts the RF signal 104 to produce the IF signal 106.

Figure 3:
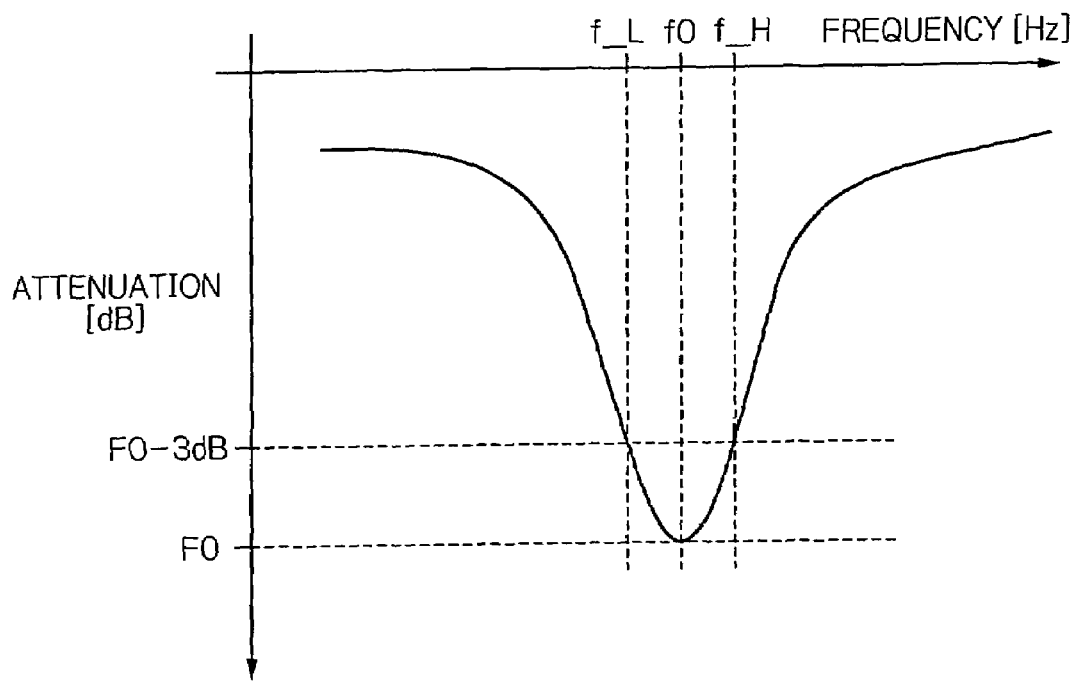
FIG. 3 plots an example of a transit loss in the trap circuit of the receiver shown in FIG. 1.

The disturbance signal attenuator 16 is used for attenuating a disturbance signal such as an image signal F0, FIG. 3, in the RF signal 104 supplied from the band-pass filter 12. In the instant illustrative embodiment, the disturbance signal attenuator 16 includes a trap circuit 18 comprising a serial connection of an inductor 20 and a capacitor 22 to attenuate the image signal F0 by means of the resonance frequency f0 of the trap circuit 18.

The trap circuit 18 of the illustrative embodiment has its resonance frequency f0 responsive to a control voltage 110 which is based on the set information of the received frequency briefly mentioned earlier. The set information of the received frequency may be represented by, e.g. a voltage value, current value, or digital data. The trap circuit 18 of the illustrative embodiment, as shown in FIG. 1, has its one end on the side of the inductor 20 connected on a supply line for the RF signal 104 between the band-pass filter 12 and the frequency mixer 14, while the other end on the side of the capacitor 22 being grounded (GND).

The capacitor 22 may be a variable-capacitance diode, such as a varicap, which varies in capacitance with the control voltage 110. In the illustrative embodiment, the varicap 22 has its capacitance Cv[F] dependent upon the control voltage 110 that is based on the set information of the received frequency. The receiver 10 of the instant embodiment has a converter, not shown, such as a digital-to-analog converter, which converts this set information into a corresponding voltage value and inputs the resultant, converted voltage value to the varicap 22 in the form of control voltage 110.

Figure 2:
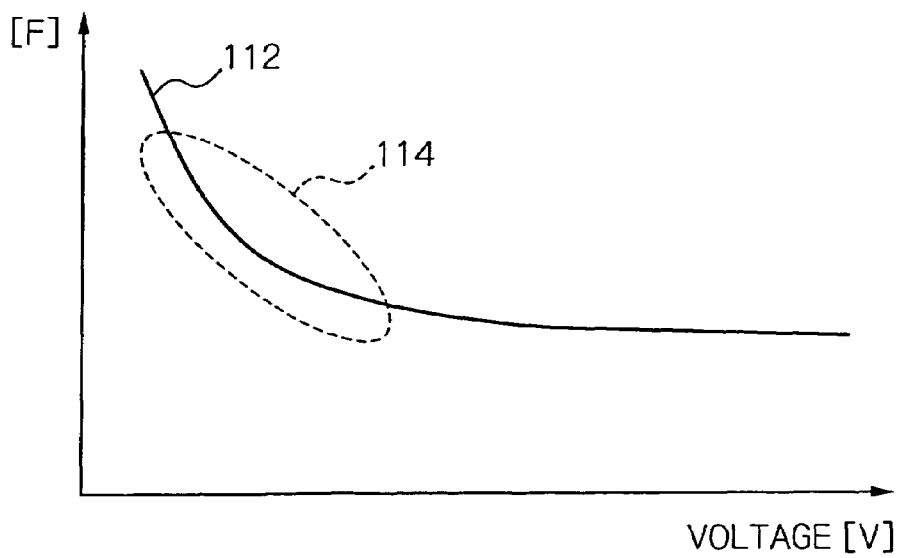
FIG. 2 plots an example of a control voltage for controlling the disturbance signal attenuator of the receiver shown in FIG. 1.

For example, the capacitor 22 has its current-voltage (CV) characteristic between the control voltage 110 and its capacitance, which is plotted on a curve 112 shown in FIG. 2. The trap circuit 18 of the illustrative embodiment may advantageously perform control with the control voltage 110 in a range 114 whose gradient is larger in the negative direction in FIG. 2.

For instance, a transit loss through the trap circuit 18 appears as shown in FIG. 3. At this time, a 3-dB band width near the resonance frequency f0 of the trap circuit 18 is determined by the quality (Q) factor of the inductor 20. If the attenuation at the resonance frequency f0 is F0, the lower of the two frequencies at an attenuation F0−3 dB is a frequency f_L, and the higher of the two frequencies is a frequency f_H, then the Q factor is expressed by the following expression (1):

$$Q=f0/((f\_H)-(f\_L))=f0/3\text{-dB band width} \quad (1)$$

In addition, if the trap circuit 18 has its impedance on a 50-Ω system, and when employing the inductor 20 with its inductance value equal to La[H] and the varicap 22 with its capacitance value equal to Cv[F], the trap circuit 18 has its resonance frequency f0 obtained by the following expression (2):

$$F0=1/(2\pi(La*Cv)^{1/2}) \quad (2)$$

Figure 4:
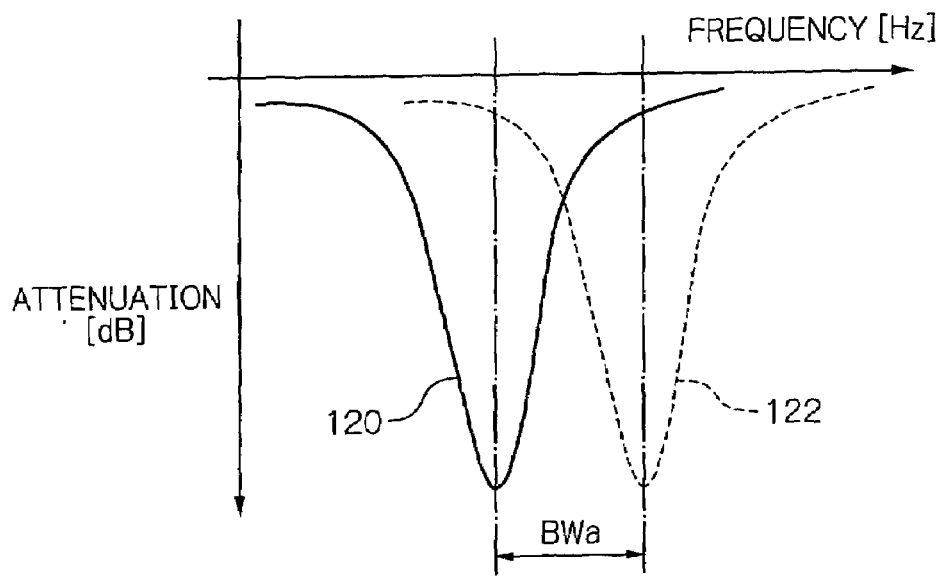
FIG. 4 is plots an example of a frequency band depending upon the control voltage of the trap circuit of the receiver shown in FIG. 1.

Thus, the resonance frequency f0 in the trap circuit 18 can be determined according to the capacitance Cv, that is, the control voltage 110. For example, if the control voltage 110 varies in a predetermined range, the resonance frequency f0 of the trap circuit 18 having the inductor 20 varies within a predetermined band range of BWa, as shown in FIG. 4, and a transit loss through the trap circuit 18 shifts from a curve 120 to a curve 122 in response to the change in the control voltage 110. In other words, the frequency band of a disturbance signal that can be suppressed by the trap circuit 18 having the inductor 20 is the predetermined band BWa.

The frequency band to be suppressed by the trap circuit 18 of the illustrative embodiment varies with an inductor value, and the inductor value necessary for setting a desired frequency band is able to be obtained in dependent upon a predetermined range in which the control voltage 110 is variable. The trap circuit 18 may thus be provided with such an inductor selected as to suppress a disturbance signal in a desired frequency band. For example, the inductor value is obtained based on the central frequency of a desired frequency band and the central value of a predetermined voltage range of the control voltage 110.

In the illustrative embodiment, a predetermined range in which the control voltage 110 is variable may be predicted beforehand and determined. Based on the predetermined control voltage range, an inductor value necessary for setting a desired frequency band may be determined beforehand, such that the inductor value may be employed in the trap circuit 18. In addition, since the frequency band of a disturbance signal which is to be attenuated from the RF signal 104 varies with equipment to which the receiver 10 is applied, a predetermined range in which the control voltage 110 is variable also depends upon the equipment.

Figure 5:
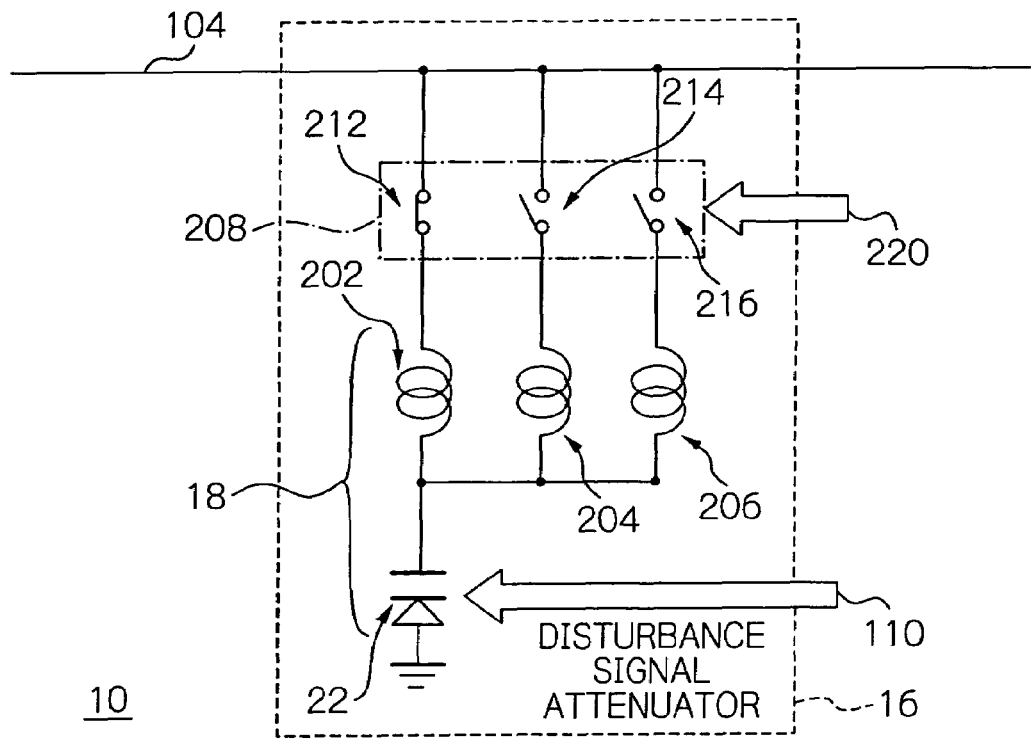
FIG. 5 is a schematic block diagram showing an alternative embodiment of the receiver of the present invention.

As an alternative embodiment, the disturbance signal attenuator 16 is adapted for adjusting the resonance frequency of the trap circuit 18 on the basis of the set information of the received frequency to thereby change a frequency band in which a disturbance signal is to be suppressed. The disturbance signal attenuator 16 of the alternative embodiment, as shown in FIG. 5, is able to adjust the resonance frequency of the trap circuit 18, by selecting any of a plurality of inductors 202, 204, and 206 which have the inductor values thereof different from each other, on the basis of the set information.

The disturbance signal attenuator 16 may have an inductor switching section 208 for selecting any of the inductors 202, 204, and 206 on the basis of the set information of the received frequency. The inductor switching section 208 of the alternative embodiment includes switch circuits 212, 214, and 216, which are connected as illustrated to the inductors 202, 204, and 206, respectively. The switch circuits 212, 214, and 216 can turn on and off the connection between a corresponding inductor and the supply line for the RF signal 104 between the band-pass filter 12 and the frequency mixer 14, on the basis of the set information.

The inductors 202, 204, and 206 have one end thereof interconnected with the varicap 22 in common, while having the other end thereof interconnected to the switches 212, 214, and 216, respectively. The switches 212, 214, and 216 are operative to selectively connect one of the inductors 202, 204, and 206 to be connected at a time to the supply line for the RF signal 104, thereby constituting the trap circuit 18.

In the receiver 10 of the instant embodiment, by predicting the range of the control voltage 110 that is input to the disturbance signal attenuator 16 beforehand, an inductor value necessary for setting a desired frequency band can be obtained. In the receiver 10 of the alternative embodiment, on the basis of a predetermined range of the control voltage 110 that is predicted beforehand, a plurality of inductor values necessary for setting a desired number of frequency bands can be respectively obtained, and a plurality of inductors having these inductor values may be provided in the disturbance signal attenuator 16.

Figure 6:
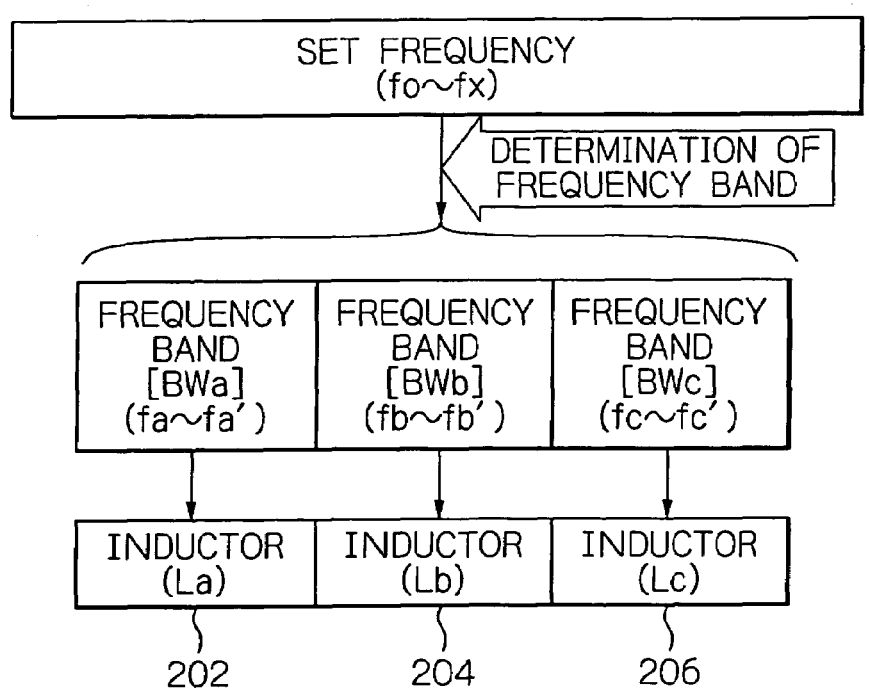
FIG. 6 shows frequency bands that can be suppressed in the disturbance signal attenuator of the receiver shown in FIG. 1.

For example, as shown in FIG. 6, in the case where the suppression of a disturbance signal in a plurality of frequency bands BWa, BWb, and BWc is desired, the receiver 10 of the instant embodiment is able to respectively determine inductor values La, Lb, and Lc based on a predetermined control voltage range. Inductors 202, 204, and 206 having these inductor values La, Lb, and Lc may be provided in the disturbance signal attenuator 16.

Therefore, the range of frequency bands in which the disturbance signal attenuator 16 can suppress a disturbance signal can be determined according to the number of inductors to be installed in that circuit 16. That is, the values and number of inductors can be determined so that a disturbance signal can be suppressed in desired frequency bands. For instance, by increasing the number of inductors, a suppressible frequency band range can be made wider.

In addition, the receiver 10 of the instant embodiment may have determining means, not shown, which determines which of the frequency bands BWa, BWb, and BWc the set frequency according to the set information of the received frequency belongs to. In this case, a control signal 220 is produced according to the result of the determination and supplied to the inductor switching section 208. The determining means may produce a control signal 220 that selects an inductor corresponding to a frequency band which is based on the result of the determination. For example, in the inductor switching section 208, when the control signal 220 selects the inductor 202, only the switch circuit 212 is turned on, whereas the switch circuits 214 and 216 are turned off.

The determining means may be implemented by software of which a program sequence produces the control signal 220. The program sequence may be stored in a memory device such as a ROM (Read-only Memory) or RAM (Random Access Memory) structurally indispensable to the receiver 10 of the instant embodiment so that it is rewritable. In addition, the determining means may be a circuit constructed by hardware which may be logically controlled by a base band signal.

Thus, in the receiver 10 of the instant embodiment, the inductor switching section 208 can select any of the inductors 202, 204, and 206 on the basis of the set information of the received frequency, and the disturbance signal attenuator 16 can switch to a suppressible frequency band.

The disturbance signal attenuator 16 may include a trap circuit comprising a serial connection of an inductor 20 and a varicap 22, a plurality of capacitors connected in parallel to the varicap 22, which have the capacitance values thereof different from each other, an capacitor switching section for selecting any of the plurality of capacitors on the basis of the set information of the received frequency, as substituted for the trap circuit 18 as shown in FIG. 5. The disturbance signal attenuator 16 is able to adjust the resonance frequency of the trap circuit, by selecting any of the plurality of capacitors which have the capacitance values thereof different from each other, on the basis of the set information, as in common to the disturbance signal attenuator 16 as shown in FIG. 5.

Figure 7:
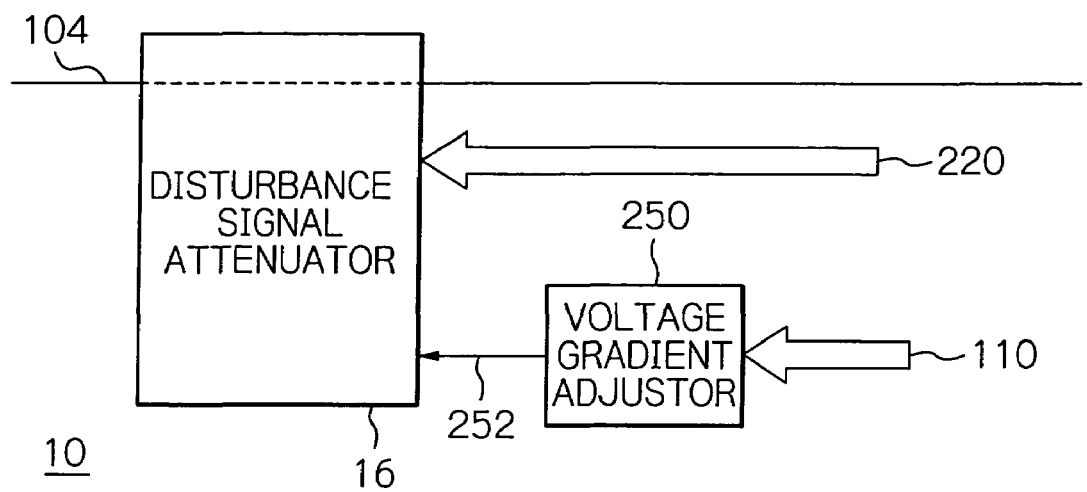
FIG. 7 is a schematic block diagram showing another alternative embodiment of the receiver of the present invention.

As another alternative embodiment, as shown in FIG. 7, the receiver 10 may supply the control voltage 110, based on the set information of the received frequency, to the disturbance signal attenuator 16 through a voltage gradient adjustor 250. In the voltage gradient adjustor 250, the control voltage 110 is converted to a required voltage 252 so that the trap circuit 18 can resonate to the frequency of a disturbance signal.

Figure 8:
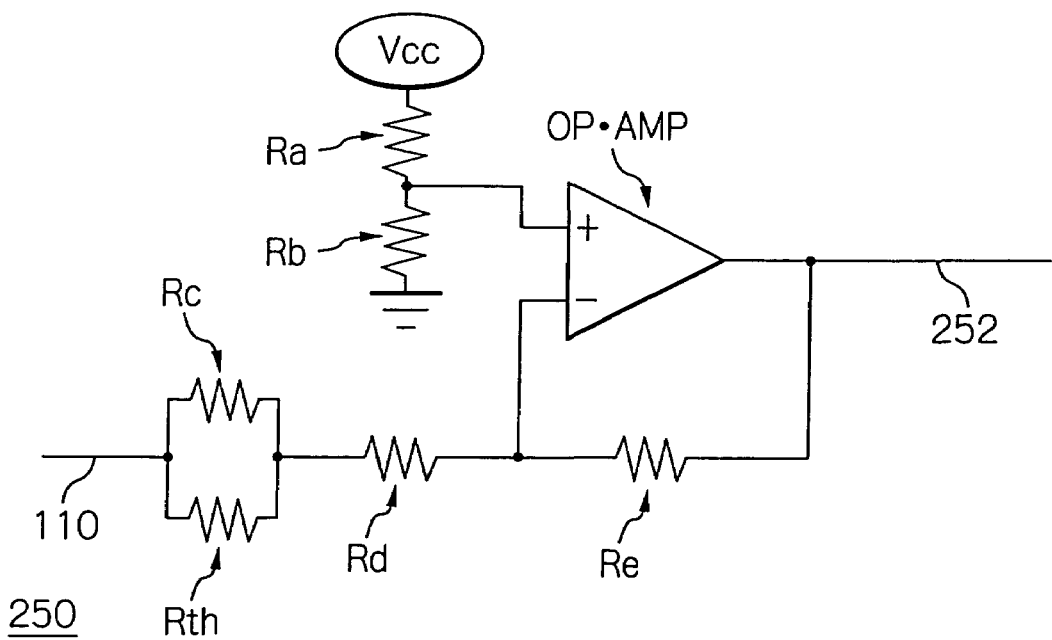
FIG. 8 is a schematic block diagram showing a voltage gradient adjustor employed in the receiver of FIG. 7.

For example, as shown in FIG. 8, the voltage gradient adjustor 250 of the instant alternative embodiment may include a differential amplifier OP-AMP, such as an operational amplifier, and a temperature sensitive resistor Rth, such as a thermistor, which are interconnected as illustrated. The voltage gradient adjustor 250 may correct a variation in the control voltage 110 due to a change in temperature and output the resultant correction voltage 252.

The differential amplifier OP-AMP has its non-inverting terminal (+) receiving a voltage, resultant from dividing a power source voltage Vcc with a series of resistance Ra and resistance Rb. The thermistor Rth is arranged to constitute a parallel circuit together with resistance Rc, and adjusts a variation in the gradient, due to a change in temperature, of the control voltage 110 input to the parallel circuit. In addition, the resistance Rc adjusts the degree of a variation in the resistance value of the thermistor Rth due to a change in temperature. Thus, the parallel circuit optimizes the correction voltage 252 that is supplied to the varicap 22 of the trap circuit 18.

In addition, the voltage gradient adjustor 250 of the present alternative embodiment includes resistance Rd and Re. The voltage gradient adjustor 250 amplifies the voltage adjusted in the parallel circuit comprising thermistor Rth and resistance Rc, in accordance with an amplification degree determined by the resistance Rd and Re, and thereby optimizes the correction voltage 252.

Thus, the voltage gradient adjustor 250 makes a temperature compensation on the control voltage 110, and outputs the correction voltage 252 finely adjusted so as for the trap circuit 18 to resonate with a disturbance signal at all times. For example, the adjustor 250 increases the resistance value of the resistance Rc constituting the parallel circuit when reducing the influence of the thermistor Rth due to a change in temperature, and reduces the resistance value of the resistance Rc when increasing that influence. If the sum of the resistance value of the combined resistance of the parallel circuit and resistance value of the resistance Rd is represented by Ri, then the resistance value Ri can be calculated by the following expression (3):

$$Ri = ((Rc * Rth)/(Rc + Rth)) + Rd \quad (3)$$

In addition, the voltage value V2 of the correction voltage 252 can be obtained by the following expression (4), using the voltage value V1 of the control voltage 110.

$$V2=(Re/Rl)*V1 \qquad (4)$$

Thus, in the receiver 10 of the instant embodiment, the voltage value 110 based on the set information of the received frequency is adjusted in the voltage gradient adjustor 250, whereby the voltage value 110 can be corrected to the voltage 252 necessary for the trap circuit 18 and therefore the trap circuit 18 can resonate to the frequency of a disturbance signal.

Figure 9:
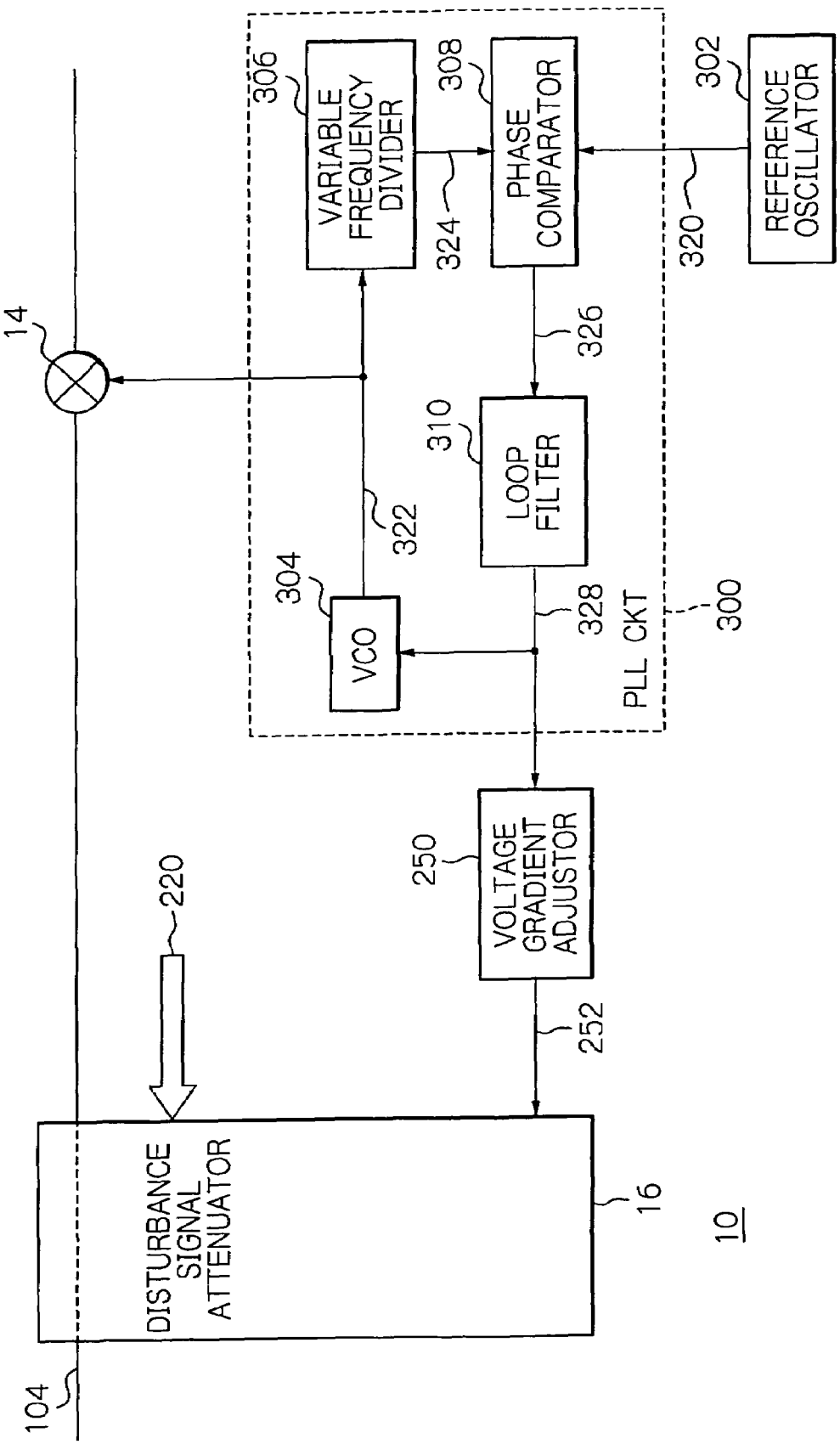
FIG. 9 is a schematic block diagram showing a still another alternative embodiment of the receiver of the present invention.

As a still another alternative embodiment, as shown in FIG. 9, the receiver 10 includes a PLL circuit 300. The trap circuit 18 in the disturbance signal attenuator 16 has its resonance frequency which may be adjusted based on a set frequency that is employed in the PLL circuit 300 as the set information of the received frequency.

As shown in FIG. 9, the PLL circuit 300 has a voltage-controlled oscillator (VCO) 304 adapted to produce a local oscillation signal 322, and a variable frequency divider 306 adapted for using a frequency dividing ratio corresponding to the set frequency to frequency-divide the oscillation signal 322 to develop a resultant frequency-divided signal 324. The PLL circuit 300 also has a phase comparator 310 adapted to phase-compare the frequency-divided signal 324 with a reference signal 320 supplied from a reference oscillator 302, and an integrating circuit 310 such as a loop filter adapted for converting a resultant comparison signal 326 to a corresponding direct current signal to produce a control voltage 328. The PLL circuit 300 is thus configured to control the frequency of the oscillation signal 322 output from the voltage-controlled oscillator 304 by the control voltage 328. The PLL circuit 300 repeats a loop of processes in these circuit components to be able to output the oscillation signal 322 which is a desired frequency signal.

The PLL circuit 300 of the instant alternative embodiment is connected to also supply the oscillation signal 322 produced in the voltage-controlled oscillator 304 to the frequency mixer 14. The frequency mixer 14 uses the local oscillation signal 322 supplied from the PLL circuit 300 to frequency-convert the RF signal 104 and produces the IF signal 106.

Particularly, the PLL circuit 300 of this alternative embodiment also supplies the control voltage 328, based on the set frequency employed in the PLL circuit 300 and produced in the loop filter 310, to the disturbance attenuator 16 as the control voltage 110 based on the set information of the received frequency. Therefore, the trap circuit 18 of the disturbance signal attenuator 16 can resonate to the frequency of a disturbance signal by the control voltage 328 based on the set frequency which is employed in the PLL circuit 300.

Figure 10:
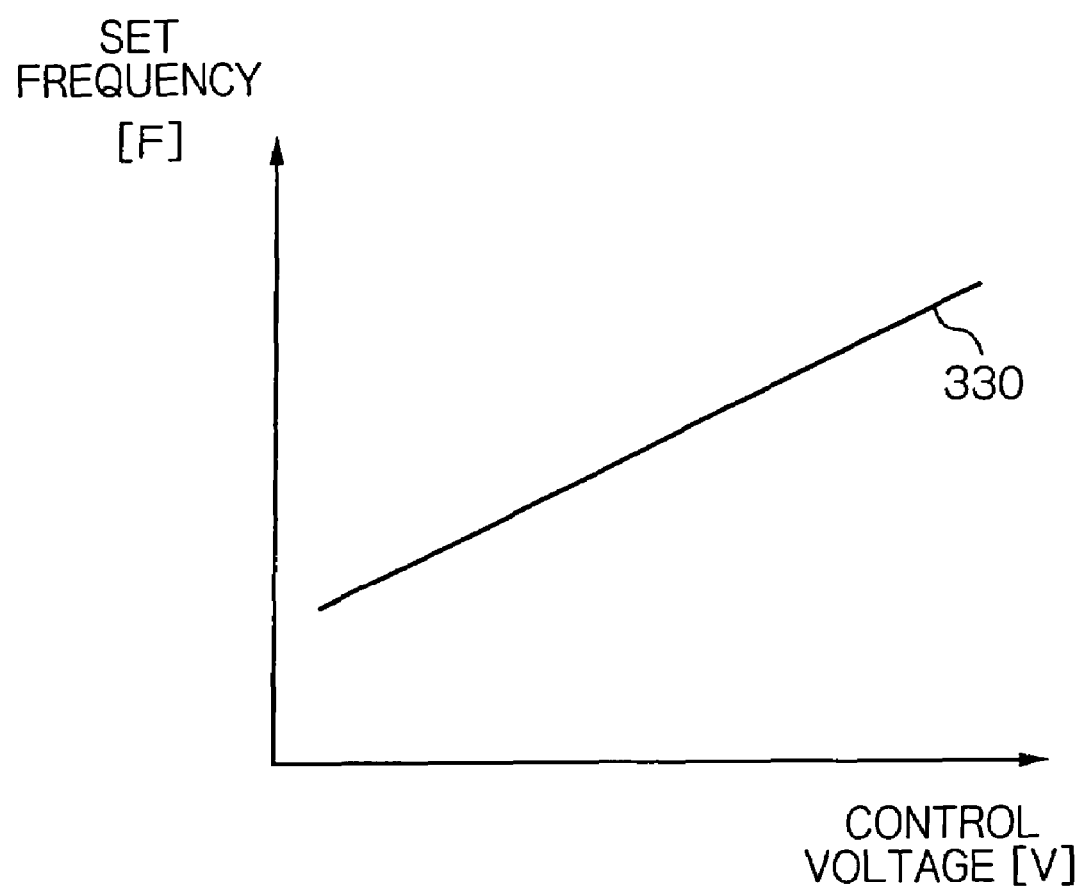
FIG. 10 plots the relationship between the set frequency and control voltage of a phase-locked loop (PLL) circuit in the receiver of FIG. 9.

For example, the receiver 10 of the instant embodiment may employ the set frequency of the PLL circuit 300 that represents a proportional relationship 330 shown in FIG. 10 and the control voltage 328.

In the case where the receiver 10 of the instant embodiment includes the voltage gradient adjustor 250, the PLL circuit 300 may be adapted such that the loop filter 310 supplies the control voltage 328 to the voltage gradient adjustor 250 so as to allow the voltage gradient adjustor 250 to adjust the control voltage 328 to thereby correct the voltage 328 to a value required for the trap circuit 18, supplying the resultant correction voltage 252 to the disturbance signal attenuator 16.

In addition, in the receiver 10 of the instant embodiment, by selecting any of a plurality of inductors 202, 204, and 206 in the inductor switching section 208 on the basis of the set frequency of the PLL circuit 330, the disturbance signal attenuator 16 can switch to a suppressible frequency band.

Next, a description will be given with respect to operation of the receiver 10 of the alternative embodiment shown in FIG. 9. An RF signal 102 received in the receiver 10 is filtered by the band-pass filter 12, and it is input to the disturbance signal attenuator 16 as an RF signal 104.

On the other hand, in the PLL circuit 300 of the receiver 10, a reference signal 302 is input to the phase comparator 308, a local oscillation signal 322 from the voltage-controlled oscillator 304 is frequency-divided by the variable frequency divider 306 in accordance with the set frequency, and the resultant frequency dividing signal 324 is supplied to the phase comparator 308. In the phase comparator 308, the reference signal 320 and the frequency dividing signal 324 are compared with each other, and the resultant comparison signal 326 is supplied to the loop filter 310. In the loop filter 310, the comparison signal 326 is converted to a corresponding direct current signal, and consequently, a control voltage 328 is produced.

This control voltage 328 is supplied to the voltage-controlled oscillator 304, in which it is used to control the frequency of a local oscillation signal 322 which the oscillator 304 oscillates. The control voltage 328 is also supplied to the voltage gradient adjustor 250, in which a temperature compensation is made. As a result, a correction voltage 252 adjusted according to a change in the temperature characteristic of the trap circuit 18 is produced.

The correction voltage 252 is supplied to the disturbance signal attenuator 16, in which it is used to determine the resonance frequency of the trap circuit 18 of the attenuator 16. In the trap circuit 18, the correction voltage 252 is input to the varicap 22 to determine the capacitance Cv[F] of the varicap 22.

In the disturbance signal attenuator 16, the control signal 220 according to the set frequency of the PLL circuit 300 is input to the inductor switching section 208. For instance, when this set frequency is within the frequency band BWa, the control signal 220 is supplied to the switching section 208, which is instructed to close only the switch circuit 212 to select the inductor 202 having the inductor value La[H].

At this time, in the inductor switching section 208, in response to the control signal 220, the switch circuit 212 is closed or turn on and the switch circuits 214 and 216 are opened or turned off. As a result, the inductor 202 and varicap 22 constitute the trap circuit 18 and are also connected on the supply line for the RF signal 104 between the band-pass filter 12 and the frequency mixer 14.

In this manner, the resonance frequency f0 determined by the above-described expression (2) implemented by the trap circuit 18. The RF signal 104 input to the disturbance signal attenuator 16 is supplied to the frequency mixer 14 after the disturbance signal has resonated and attenuated at the resonance frequency f0 in the trap circuit 18 in accordance with the set frequency of the PLL circuit 300.

For example, although the application of the receiver in accordance with the present invention has been described, the present invention can also be applied to receivers in various radio systems such as a personal handy-phone (PHS) system, a wireless local area network (WLAN), Bluetooth (trademark), etc.

The entire disclosure of Japanese patent application No. 2005-270398 filed on Sep. 16, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A receiver for receiving a radio frequency signal, comprising:
   an attenuator for attenuating a disturbance signal which causes disturbance to a received frequency of the radio frequency signal, on a basis of set information of the received frequency;
   said attenuator comprising a trap circuit for producing a resonance frequency according to the set information;
   said trap circuit being connected on a supply line for the radio frequency signal to suppress the disturbance signal by the resonance frequency, wherein
   said trap circuit is supplied with a control voltage based on the set information;
   said trap circuit comprising an inductor and a variable capacitance diode, said variable capacitance diode having a capacitance determined by the control voltage supplied, said trap circuit producing the resonance frequency according to an inductor value of said inductor and said capacitance, wherein
   said attenuator comprises a switch circuit for selecting any of a plurality of different frequency bands on a basis of the set information; and
   said trap circuit produces a resonance frequency according to the frequency band selected by said switch circuit, wherein
   a plurality of inductor values are determined so that the plurality of different frequency bands are obtained, on the basis of a predetermined range of the control voltage which is predicted beforehand;
   said attenuator comprising a plurality of inductors each of which has different one of the plurality of inductor values;
   said switch circuit selecting any of said plurality of inductors on the basis of the set information; and
   said trap circuit being formed by the inductor selected by said switch circuit and said variable capacitance diode.

2. The receiver in accordance with claim 1, wherein
   said switch circuit comprises a plurality of switch circuits arranged between said supply line and said plurality of inductors so that said switch circuits correspond respectively to said plurality of inductors; and
   said switch circuit turns on or off said plurality of switch circuits on the basis of the set information to thereby select one of said plurality of inductors.

3. The receiver in accordance with claim 1, further comprising an adjuster for adjusting the control voltage, the control voltage being supplied to said trap circuit through said adjuster;
   said adjuster correcting a variation in the control voltage due to a change in temperature, thereby coping with a change in a temperature characteristic of said trap circuit.

4. The receiver in accordance with claim 3, wherein said adjuster corrects a variation in the control voltage due to a change in temperature by a circuit comprising a differential amplifier and a temperature sensitive resistor.

5. The receiver in accordance with claim 4, wherein said a differential amplifier is an operational amplifier and said temperature sensitive resistor is a thermistor.

6. The receiver in accordance with claim 1, further comprising a phase-locked loop circuit which has a voltage-controlled oscillator and produces a local oscillation signal; wherein
   said phase-locked loop circuit produces a control voltage for controlling said voltage-controlled oscillator, on the basis of a predetermined set frequency, and supplies the control voltage to said trap circuit as the control voltage based on the set information; and
   said switch circuit selects one of said plurality of inductors on the basis of said set frequency as the set information.

7. The receiver in accordance with claim 6, wherein said phase-locked loop circuit frequency-divides the local oscillation signal on the basis of the set frequency; phase-compares a result of frequency dividing with an input reference signal; converts a result of comparison to a direct current signal to thereby produce the control voltage; and controls said voltage-controlled oscillator according to the control voltage, thereby controlling a frequency of the local oscillation signal.

8. The receiver in accordance with claim 1, wherein said disturbance signal is an image signal.

9. A method, in a receiver for receiving a radio frequency signal, of attenuating a disturbance signal which causes disturbance to a received frequency of the radio frequency signal, said method comprising:
   a first step of producing a resonance frequency according to set information of the received frequency, in a trap circuit connected on a supply line which supplies the radio frequency signal; and
   a second step of suppressing the disturbance signal by said resonance frequency in the trap circuit;
   whereby the disturbance signal is attenuated on a basis of the set information,
   said method further comprising a third step of supplying a control voltage based on the set information to the trap circuit, wherein the trap circuit comprises an inductor and a variable capacitance diode;
   said first step supplying, in the trap circuit, the control voltage to the variable capacitance diode to determine a capacitance of the diode, and producing the resonance frequency according to an inductor value of the inductor and the capacitance
   said method further comprising a fourth step of selecting one of a plurality of different frequency bands on the basis of the set information; wherein
   in the trap circuit, said first step produces a resonance frequency according to the frequency band selected in said fourth step, wherein
   a plurality of inductor values are determined on the basis of a predetermined range of the control voltage which is predicted beforehand so that the plurality of different frequency bands are obtained; and
   said fourth step select on the basis of the set information one of a plurality of inductors each of which has corresponding one of the plurality of inductor values, so that the trap circuit is formed by the selected inductor and the variable capacitance diode.

10. The method in accordance with claim 9, wherein said fourth step controls a plurality of switch circuits arranged between the supply line and the plurality of inductors so that each of the plurality of switch circuits corresponds to different one of the plurality of inductors, and turns on or off the plurality of switch circuits on the basis of the set information to thereby select one of the plurality of inductors.

11. The method in accordance with claim 9, further comprising a fifth step of adjusting the control voltage, wherein said third step supplies the control voltage to the trap circuit through said fifth step; and said fifth step corrects a variation in the control voltage due to a change in temperature, thereby coping with a change in a temperature characteristic of the trap circuit.

12. The method in accordance with claim 11, wherein said fifth step uses a circuit comprising a differential amplifier and a temperature sensitive resistor to compensate for a variation in the control voltage due to a change in temperature.

13. The method in accordance with claim 12, wherein said a differential amplifier is an operational amplifier and said temperature sensitive resistor is a thermistor.

14. The method in accordance with claim 9, further comprising a sixth step of producing a local oscillation signal in a phase-locked loop circuit having a voltage-controlled oscillator, wherein said sixth step uses the phase-locked loop circuit to produce a control voltage for controlling the voltage-controlled oscillator on the basis of a set frequency of the phase-locked loop circuit, and supplies the control voltage to the trap circuit as the control voltage based on the set information; and said fourth step selects one of the plurality of inductors on the basis of the set frequency as the set information.

15. The method in accordance with claim 14, wherein, in the phase-locked loop circuit, said sixth step frequency-divides the local oscillation signal on the basis of the set frequency; phase-compares a result of frequency dividing with an input reference signal; converts a result of comparison to a direct current signal to thereby produce the control voltage; and controls the voltage-controlled oscillator according to the control voltage, thereby controlling a frequency of the local oscillation signal.

16. The method in accordance with claim 9, wherein said disturbance signal is an image signal.

* * * * *